United States Patent
Storch et al.

(10) Patent No.: US 7,338,419 B2
(45) Date of Patent: Mar. 4, 2008

(54) TOOL COUPLER FOR CONNECTING TOOL HEADS, SUCH AS DRILLS, REAMERS, MILLERS, TURN-CUTTERS, DIES, AND RAMS, TO A TOOL HOLDER

(75) Inventors: Helmut Storch, Rothenburg (DE); Robert A. Erickson, Raleigh, NC (US)

(73) Assignee: Kennametal Inc., Latrobe, PA (US)

( * ) Notice: Subject to any disclaimer, the term of this patent is extended or adjusted under 35 U.S.C. 154(b) by 100 days.

(21) Appl. No.: 11/349,667

(22) Filed: Feb. 8, 2006

(65) Prior Publication Data

US 2006/0127197 A1 Jun. 15, 2006

Related U.S. Application Data

(63) Continuation-in-part of application No. PCT/EP04/07279, filed on Jul. 3, 2004.

(30) Foreign Application Priority Data

Aug. 11, 2003 (DE) ................. 103 36 869

(51) Int. Cl.
  *B23Q 3/155* (2006.01)
  *B23C 5/00* (2006.01)
(52) U.S. Cl. .................. 483/9; 409/234; 409/232
(58) Field of Classification Search ........ 483/7, 483/9, 41, 43, 44, 47, 54, 56, 59, 28, 67, 483/18, 19, 901; 409/231, 232, 233, 234; 408/239 R, 238, 239 A, 240; 29/39, 40
See application file for complete search history.

(56) References Cited

U.S. PATENT DOCUMENTS

| | | | | |
|---|---|---|---|---|
| 4,588,339 A | * | 5/1986 | Bilz | 409/234 |
| 4,799,308 A | * | 1/1989 | Kitamura | 483/41 |
| 4,833,772 A | * | 5/1989 | Kobayashi et al. | 483/44 |
| 4,835,838 A | * | 6/1989 | Hirose | 483/47 |
| 4,856,177 A | * | 8/1989 | Takeuchi et al. | 483/9 |
| 4,860,429 A | * | 8/1989 | von Haas | 483/43 |
| 4,875,275 A | * | 10/1989 | Hutchinson et al. | 279/93 |
| 4,883,939 A | * | 11/1989 | Sagi | 219/125.1 |
| 4,928,381 A | * | 5/1990 | Yaguchi et al. | 483/47 |
| 4,976,575 A | * | 12/1990 | Kappelhof et al. | 409/233 |
| 5,020,210 A | * | 6/1991 | Fujimoto | 483/54 |
| 5,118,231 A | * | 6/1992 | Daniels | 409/232 |

(Continued)

FOREIGN PATENT DOCUMENTS

DE  3326615 A1 * 1/1985

(Continued)

OTHER PUBLICATIONS

European Website Translation of DE3916315 (cited on IDS of Mar. 16, 2006).*

(Continued)

*Primary Examiner*—Dana Ross
(74) *Attorney, Agent, or Firm*—Larry R. Meenan (57) ABSTRACT

A tool coupler for connecting tool heads, such as drills, reamers, millers, turn-cutters, dies, and rams, to a tool holder. The tool coupler has a hollow shaft, a ring-shaped collar, and a gripper groove, in which gripper groove are disposed two diametrically opposite blind bore holes with varying bore hole contours.

18 Claims, 2 Drawing Sheets

U.S. PATENT DOCUMENTS

| | | | |
|---|---|---|---|
| 5,134,767 A * | 8/1992 | Yasuda | 483/7 |
| 5,250,017 A * | 10/1993 | Ariyoshi | 483/18 |
| 5,300,006 A * | 4/1994 | Tanaka et al. | 483/56 |
| 5,372,568 A * | 12/1994 | Matsuoka | 483/56 |
| 5,443,340 A * | 8/1995 | Reinauer et al. | 409/233 |
| 5,462,293 A * | 10/1995 | Samelius et al. | 279/4.03 |
| 5,499,963 A * | 3/1996 | Fujimoto et al. | 483/56 |
| 6,045,308 A * | 4/2000 | Frank et al. | 409/234 |
| 6,106,446 A * | 8/2000 | Kelly et al. | 483/28 |
| 6,135,933 A * | 10/2000 | Kelly et al. | 483/28 |
| 6,231,282 B1* | 5/2001 | Yoneyama et al. | 409/234 |
| 6,442,815 B1 * | 9/2002 | Moon et al. | 29/40 |
| 6,467,145 B1* | 10/2002 | Porta | 29/40 |
| 6,619,897 B2* | 9/2003 | Erickson et al. | 409/234 |
| 2003/0156401 A1* | 8/2003 | Komine et al. | 361/815 |
| 2005/0238451 A1* | 10/2005 | Hartman | 409/234 |
| 2006/0039770 A1* | 2/2006 | Hughes et al. | 409/234 |

FOREIGN PATENT DOCUMENTS

| | | | |
|---|---|---|---|
| DE | 3807140 A1 | * | 12/1988 |
| DE | 3916315 A1 | * | 11/1990 |
| EP | 1339014 A1 | * | 8/2003 |
| WO | WO88/05360 | * | 7/1988 |
| WO | WO98/31494 | * | 7/1998 |

OTHER PUBLICATIONS

Foshag S: "Kontinuierliche Entwicklung Bei Den Werkzeugen" Werkstatt Und Betrieb, Carl Hanser Verlag. Munchen, DE, vol. 124, No. 9, Sep. 01, 1991, pp. 720-724, XP000241534.*

* cited by examiner

TOOL COUPLER FOR CONNECTING TOOL HEADS, SUCH AS DRILLS, REAMERS, MILLERS, TURN-CUTTERS, DIES, AND RAMS, TO A TOOL HOLDER

CONTINUING APPLICATION DATA

This application is a Continuation-In-Part application of International Patent Application No. PCT/EP2004/007279, filed on Jul. 3, 2004, which claims priority from Federal Republic of Germany Patent Application No. 103 36 869.8, filed on Aug. 11, 2003. International Patent Application No. PCT/EP2004/007279 was pending as of the filing date of this application. The United States was an elected state in International Patent Application No. PCT/EP2004/007279.

BACKGROUND

1. Technical Field

The application generally relates to a tool coupler for connecting tool heads, such as drills, reamers, millers, turn-cutters, dies, and rams, to a tool holder. The application further relates to a tool coupler for connecting a replaceable tool head to a machine tool comprising an at least partly or fully conical or cylindrical hollow shaft and a ring-shaped collar interacting with a correspondingly configured receiving bore hole and a ring-shaped opposite surface of a basic holder on a machine tool, where the basic holder and the tool coupler can be locked by means of clamping elements actuated via a clamping device in such a way that the collar of the tool coupler abuts on the opposite surface of the basic holder, and the tool coupler is provided with a continuous gripper groove for a gripping device used in automatic tool replacement.

2. Background Information

Couplers of this type are known, for example, from EP 0 343 190 B1 where the latter coupler works with balls as clamping elements, which are driven via a tension rod radially outward when the tool is mounted and radially inward when the tool is removed into existing openings. Another comparable tool coupler with wedge-shaped clamping elements is shown and described in DE 38 07 140 C2. The combination of a hollow cone shaft, which, compared to the respective receiving bore hole, is slightly overdimensioned in the range of elastic deformation, with the mutual flat abutment achieves high axial rigidity under static and dynamic load forming a tool coupler for connecting a tool holder and a basic holder, possibly in the form of a machine tool spindle seat, which is useable in tool machines for turning, drilling and milling. As a result, the machine tool can be used as a machining center for many different cutting operations. In fully automated production, the so-called tool replacement systems are becoming increasingly important where, instead of manually replacing the tool, a gripper groove is provided an the tool head or on the tool coupler for replacing the tool head.

However, in order to precisely adjust the tool head and the tool coupler, which may also be a separate intermediate piece for seating and mounting a tool head, in a machine tool spindle or a basic holder on the one hand and a tool magazine, such as a revolving disk, on the other hand, with regard to the angle of rotation, further positioning elements are required. According to prior art, catches or other switching areas and locating faces disposed on the outside surface of the tool coupler are used in connection with positioning elements, such as pins in the basic holder or a machine spindle. In order to orient the tool coupler in the magazine on the one hand and in the tool coupler seat on the other hand and for preventing 180° misalignments, such switching areas and locating faces are provided on diametrically opposite surface areas of the tool coupler.

For the tool carrier according to EP 1 007 256 B1, diametrically opposite recesses are used, which have to be configured with varying geometry for the above mentioned reasons. The unbalance resulting from the configuration manifests itself especially in tools rotating at high speed. In order to compensate the source of unbalance and other unbalances resulting from asymmetrical tool coupler configurations, it is proposed for the tool carrier according to EP 1 007 256 B1 to provide one or more bore holes on the inside of the tool carrier. However, the tool carrier of EF 1 007 256 B1 is disadvantageous in that it matches only one certain machine tool type.

OBJECT OR OBJECTS

The objective of at least one embodiment of the present application is to improve the above mentioned tool coupler so as to provide an alternative that is essentially universally useable for multiple types of machines and allows maximum positioning accuracy for the angle of rotation with maximum weight compensation so as to prevent and/or minimize unbalance.

SUMMARY

The problem is solved by means of a tool coupler according to at least one embodiment described herein, where, in accordance with the invention, the gripper groove is provided with two diametrically opposite blind bore holes with varying bore hole contours. In contrast with the solutions of the prior art, the diametrically opposite arrangement of the bore holes in the groove largely counteracts the unbalance. Additional bore holes for compensation of unbalance, which can weaken the body of the tool coupler, otherwise are not required, which advantageously simplifies the manufacture of such tool couplers. The advantageously conical configuration of the hollow shaft in connection with the flat abutment and the radially outward moving clamping elements for clamping the tool coupler, especially clamping balls, which are subject to centrifugal forces when the tool rotates, achieves dynamic rigidity in addition to static rigidity and prevents and/or minimizes unbalance at high speeds. Furthermore, the varying contours of the diametrically opposite blind bore holes can be made such that, both statically and dynamically (under rotation), the "mass removed" via the recesses is fully or at least substantially compensated.

The blind bore holes are further advantageous in that they, in connection with positioning pins, allow an accurate tool coupler adjustment, both axially and with regard to the angle of rotation, so that the chances of tool misalignments are minimized and/or virtually eliminated.

Other possible embodiments are described herein below. For example, the blind bore holes are advantageously disposed centrically relative to the gripper groove, and as a further advantage, their diameter is greater, at least in the top area, than the width of the groove.

According to another possible embodiment, in cross-section, the blind bore holes can have a top area, which is wider in diameter, and an additional area with a smaller diameter joining the bore hole bottom. Advantageously, the diameters of the blind bore holes in the upper area are identical.

The bottom area of the step-like configured blind bore hole uniformly has a smaller, but possibly different, diameter on opposite sides. Accordingly, one of the blind bore holes may have a smaller diameter in the bottom area and a greater depth, and vice versa, on the other side, it may have a comparatively greater diameter, but a lesser depth. The varying geometry can also be realized by means of a partly conical bore hole bottom or a flat bore hole bottom, thereby effectively preventing 180° errors in the angle of rotation for the tool coupler of the invention.

To further explain, differently shaped or contoured bore holes can be used to determine the orientation or positioning of the tool coupler and its corresponding tool. By making one bore hole different from the other bore hole, a correspondingly designed gripper device of an automatic tool changing system can essentially only be able to grip the tool coupler one way. In this manner, a reverse or vice-versa gripping of the tool coupler can be prevented, and thus an orientation that is off by 180° can be essentially avoided. On the other hand, if the oppositely-positioned bore holes were identically shaped, the chance would exist that the gripper device could grip the tool coupler incorrectly, thus producing an incorrect orientation of the tool in the machine.

Furthermore, for automated tool replacement, it is desirable that the respective tool or tool head can be automatically identified. To achieve this identification, readable microchips integrated on or in the tool coupler can be used. Maximum readability is ensured when the microchips are provided on the outside surface of the body of the respective carrier or tool coupler. If, according to a further possible embodiment, a tool coupler is used with two additional diametrically opposite blind bore holes disposed so as to be offset by 90° relative to the above described blind bore holes (with varying contours), the microchip can be mounted in one of the additional bore holes. The resulting radial inward move adequately protects the microchip against external mechanical effects. In other words, the microchip is set in the blind bore hole to avoid physical or mechanical damage, but also to permit accessability for identification purposes. Such additional diametrically opposite bore holes have an identical or substantially identical contour. While one of the additional bore holes serves to receive the microchip, the opposite bore hole eliminates the static dynamic unbalance. Advantageously, the two bore holes are configured to be flat, which means they have a greater diameter than the measure of their depth. The diameter of the bore holes can be identical to the diameter of the top areas of the two blind bare holes with varying contours.

If required, however, each of the additional bore holes can be used in the manner described above with respect to the blind bore holes, so that in principle, four bore holes, each offset by 90° from the nearest bore holes, can be used for positioning or adjusting the tool head.

According to another embodiment, the whole of the four existing blind bore holes in the form of two diametrically opposite bore hole pairs is configured such that the tool coupler is fully balanced.

Depending on the intended use, the tool couplers can vary in size matching the size of the spindle or other adapters and intermediate pieces that are used. The standard system sizes range between 32 mm and 160 mm, preferably between 40 mm and 100 mm. The standard diameters are between 40 mm and 80 mm. Depending on the diameter of the tool couplers, a greater or smaller diameter is used for the blind bore holes. Advantageously, the diameters range between 10 mm and 20 mm, especially between 10 mm and 16 mm. It should be understood that the above ranges include all numbers in whole numbers and in tenth of a millimeter increments.

According to another embodiment, based on a frontal view of the tool coupler, the blind bore holes with varying contours are disposed on a vertical plane relative to the connecting line of the openings in the hollow shaft for locking the clamping elements. Accordingly, the additional blind bore holes, one of which carries the microchip are offset by 90°.

The configuration of the four equally spaced holes in the gripper groove area of the tool holder was selected to provide the maximum amount of flexibility to a machine tool builder when applying the tools to their machine. This configuration can satisfy the requirements for tool couplers that are usually necessary for the tool holder or coupler to be usable in most tool machines. One such requirement is radial location, i.e. orienting the tool coupler for placement in a tool machine. This configuration helps ensure that the tool holder is aligned with the receiving structure of a tool machine to be accepted into the tool machine properly for use in a machining operation.

Another such requirement is the orientation of the tool coupler within a storage magazine for storing various tools. Certain types of tool holder magazines require an orientation feature located in the gripper groove area of the tool coupler. It is therefore advantageous for the tool coupler to provide the ability to be set at one position or a position that is 180 degrees from that position. This means that a storage receptacle, using the gripper groove area orientation, can be set up to only accept tools and their corresponding couplers oriented one way.

Each of the four holes in this configuration also can function as data chip or microchip receptacles. Since it cannot be determined which position in the gripper groove area that the machine tool builder will use to place the data chip (if used), designing all four of the holes to accept standard data chips allows for maximum flexibility for use in various machines.

Also, the configuration of the four holes function to balance the tool coupler. The configuration of the four holes, in at least one embodiment, should be such that each one balances the one 180 degrees from it. This is called "balance by design" and allows for higher rotational speeds without excessive additional balance requirements.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the invention is illustrated in the drawings, as follows.

DESCRIPTION OF EMBODIMENT OR EMBODIMENTS

Figure 1:
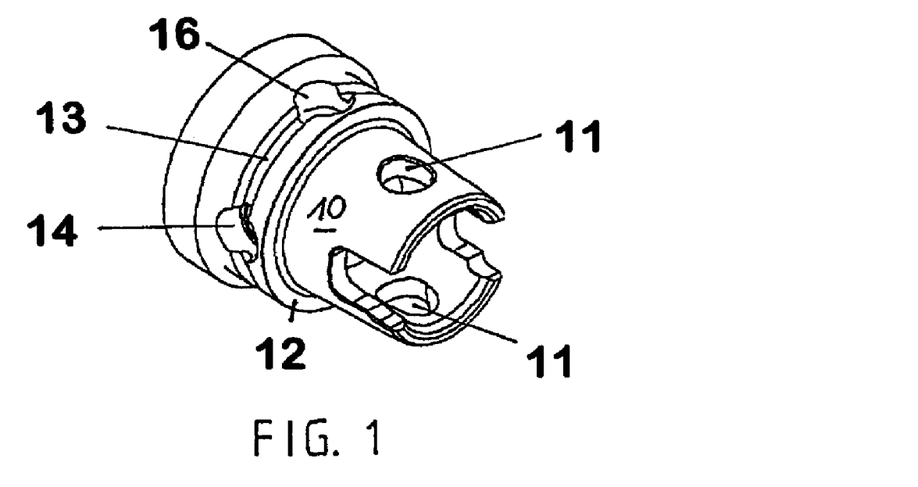
FIG. 1 is a perspective view of a tool coupler according to at least one possible embodiment.

The tool coupler illustrated in FIG. 1 has a hollow shaft 10 with a conical outside surface provided with opposite openings 11 by means of which the tool coupler can be mounted in a machine spindle in connection with ball-shaped clamping elements (not shown). Furthermore, the tool coupler has a ring-shaped caller interacting with a correspondingly configured ring-shaped opposite surface of a basic holder on the machine tool. Tool couplers at this kind have been described in detail in EP 0 343 190 E1, for example. In addition, the tool coupler is provided with a substantially V-shaped continuous gripper groove 13 in which a gripping device (not shown) engages when the tool is replaced. On the side opposite the hollow shaft 10, the actual tool head is mounted for carrying the tool (not shown).

Figure 2:
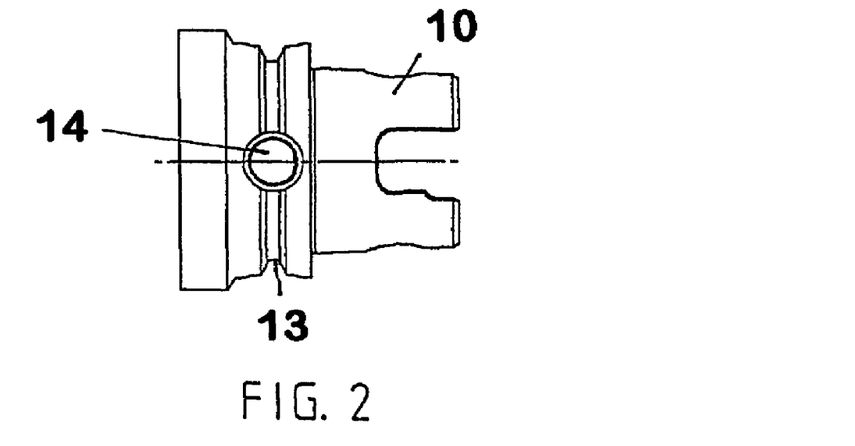
FIGS. 2 and 3 are side views of the tool coupler, offset by 90°.
Figure 3:
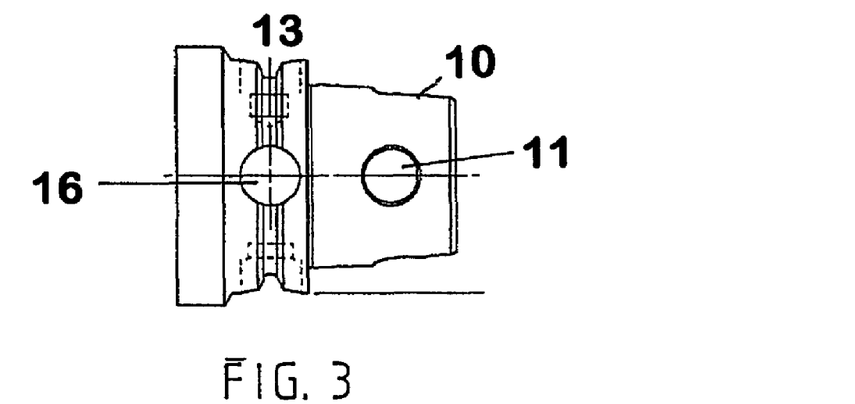
Figure 4:
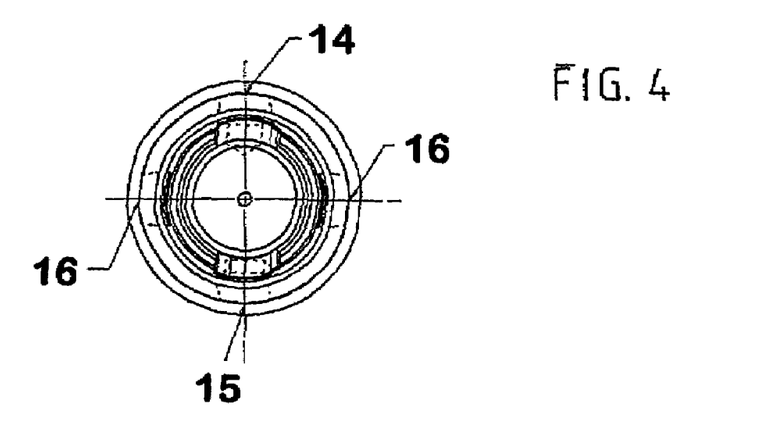
FIG. 4 is a sectional view of the tool coupler in the area of the blind bore holes.
Figure 5:
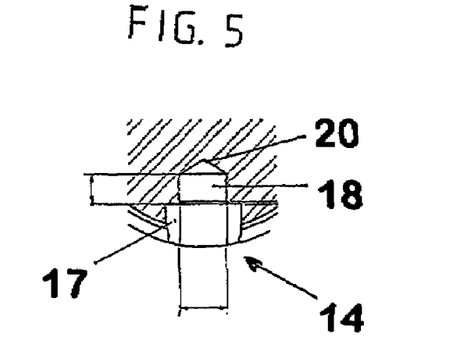
FIGS. 5 to 7 are the cross-sections of the respective blind bore holes.
Figure 6:
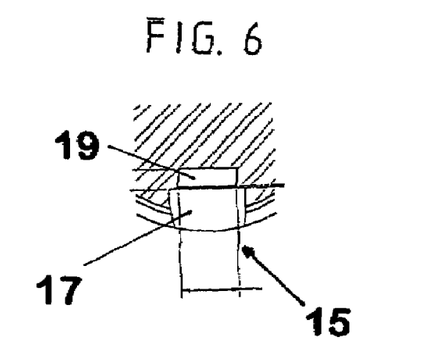
Figure 7:
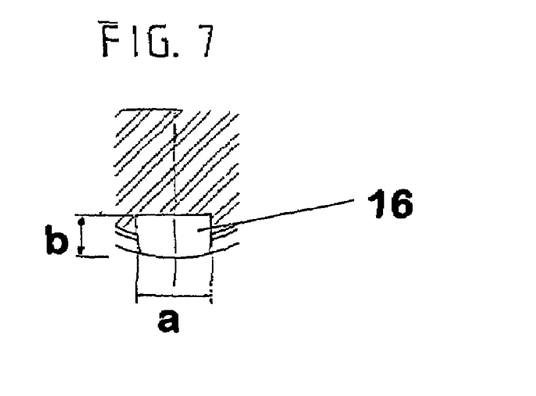

According to at least one possible embodiment, the tool coupler is first provided with two diametrically opposite blind bore holes 14 and 15 whose varying cross-sections are illustrated in FIGS. 5 and 6. The bore holes or their connecting line (an imaginary line drawn through the centers of both holes 14, 15) is vertical or perpendicular relative to the connecting line of the two above described openings 11 in the hollow shaft 10. Two diametrically opposite flat bore holes 16 having the same contours are offset by 90° with respect to the bore holes 14, 15. The connecting line (an imaginary line drawn through the centers of both holes 16) is disposed parallel to the connecting line of the two openings 11. The bore hole 16 shown in FIG. 1 serves as a compensating bore hole for eliminating or minimizing the unbalance which would be generated if the opposite bore hole 16, in which the microchip is disposed, were the only one. The microchip comprises a data memory containing the identification codes for the respective tool. The bore holes 14, 15 and 16 are disposed centrically relative to the gripper groove, as illustrated by FIGS. 2 and 3. In this case, the bore hole 16 has a substantially uniform diameter a of 10 mm with a lesser bore hole depth b of 5.4 mm.

In at least one possible embodiment, a microchip is disposed in one of the bore holes 16 and comprises a memory with readable information for tool identification. The arrangement of the microchip in the bare hole 16 protects the microchip against external mechanical or physical damage.

The bore holes 14 and 15, on the other hand, have varying contours. According to a special exemplary embodiment, the top area 17 of the bore holes 14 and 15 has the same contour as bore hole 16. It is joined by a bottom area 18 or 19. The bare hole 14 shown in FIG. 5 has a bottom area 18 with a cylindrical area joined by a conically configured bore hole bottom 20. The bare hole 14 is used for the controlled positioning of the tool coupler in the seat provided in the machine (spindle or basic holder), where it can be determined, for example by means of spring-loaded pins with a conical end in the basic holder, when the tool coupler and thus the tool head have reached the position with the desired angle of rotation. The opposite bore hole 15 instead has a cylindrical bottom area 19 with a smaller diameter than the top area 17, but the bore hole is considerably flatter, i.e. it has a lesser depth. The bore hole 15, in connection with respective positioning pins, serves to orient the tool coupler in a magazine. In another possible embodiment, the roles of the two bare holes 14, 15 in orienting the tool coupler in the magazine could be reversed.

In at least one possible embodiment, the two holes 16 are identical and located 180 degrees apart in the gripper groove area. They are generally larger in diameter than they are deep, with straight sides and a flat bottom. The dimensions of the holes are based on the requirements of a hole to accept a data chip or microchip. They are deep enough to allow a chip to be assembled into the hole and not have it protrude above the gripper groove area diameter, thus protecting it during use. While the dimensions of these holes 16 is based an data chip dimensions, these holes 16, in at least one embodiment, are designed to accept short pins, located in the gripper assembly or gripper device, that provide radial location of the tool coupler during a tool change. This is necessary to align the key slots with the keys in the tool spindle.

In at least one possible embodiment, the holes 14, 15 are the tool magazine orientation holes. The dimensions of the outermost holes, indicated by 17 in the figures, could be identical to the dimensions of the holes 16. They could also be a different size, as long as they allow the use of a standard data chip. The innermost holes, 18 and 19, have different dimensions. Hole 19 has a larger diameter, shorter depth and a flat bottom when compared to hole 18. Hole 18 has a smaller diameter, a deeper depth and a conical bottom 20 when compared to hole 19. A tool magazine or storage receptacle that has a pin designed to fit into hole 18 with a partially conical end that extends into portion 20 will restrict the movement of the tool coupler into a storage receptacle if it is attempted to put hole 19 over it. A tool magazine or storage receptacle that has a pin designed larger in diameter than hole 18 but smaller in diameter than hole 19 restricts the movement of the tool coupler into a storage receptacle if it is attempted to put hole 18 over it. In this way, a storage receptacle can be virtually "error proofed" so that tool couplers can only be assembled into the storage device in one orientation. The hole 180 degrees opposite the orientation hole becomes a prime candidate for a data chip (if used). Holes 18 and 19 can also be used to "error proof" the gripper and gripper arm if so desired in at least one possible embodiment.

In another possible embodiment, all four of the holes 14, 15, 16 located around the gripper groove 13 are designed to accept standard data chips. The outmost holes 17 may be the same dimensions as the holes 16, or they may be smaller or larger as long as they allow for the use of a data chip.

The gripper groove/hole configuration is designed for maximum flexibility for the machine tool builder. In one possible embodiment. the data chip (if used) will go into one of the holes 14, 15. At least one of the 16 holes may be used for radial orientation. If a disk type storage device is used, the hole 14 or hole 15, opposite the one used with the chip, would be used for "error proof" orientation. Since a data chip can be placed in any one of the four holes, this data chip configuration can be changed to suit the machine tool configuration.

One feature or aspect of an embodiment is believed at the time of the filing of this patent application to possibly reside broadly in a tool coupler for connecting a replaceable tool head to a machine tool comprising an at least partly or fully conical or cylindrical hollow shaft and a ring-shaped collar interacting with a correspondingly configured receiving bore hole and a ring-shaped opposite surface of a basic holder on the machine tool, where the basic holder and the tool coupler can be locked by means of clamping elements actuated via a clamping device in such a way that the collar of the tool coupler abuts on the opposite surface of the basic holder, and the tool coupler is provided with a continuous gripper groove for a gripping device used in automatic tool replacement, characterized in that the gripper groove is provided with two diametrically opposite blind bore holes with varying bore hole contours.

Another feature or aspect of an embodiment is believed at the time of the filing of this patent application to possibly reside broadly in a tool coupler, characterized in that the blind bore holes are disposed centrically relative to the gripper groove and/or have a maximum diameter that is greater than the width of the groove.

Yet another feature or aspect of an embodiment is believed at the time of the filing of this patent application to possibly reside broadly in a tool coupler, characterized in that in cross-section the blind bore holes have a top area wider in diameter and a bottom area with a smaller diameter joining the bore hole bottom.

Still another feature or aspect of an embodiment is believed at the time of the filing of this patent application to possibly reside broadly in a tool coupler, characterized in that the bore hole bottom of one of the blind bore holes is flat and that of the other blind bore hole is configured at least partly conically.

A further feature or aspect of an embodiment is believed at the time of the filing of this patent application to possibly reside broadly in a tool coupler, characterized in that additionally, two more diametrically opposite blind bore holes are provided disposed so as to be offset by 90° from the blind bore holes with varying bore hole contours.

Another feature or aspect of an embodiment is believed at the time of the filing of this patent application to possibly reside broadly in a tool coupler, characterized in that the additional blind bore holes are greater in diameter (a) than in depth (b).

Yet another feature or aspect of an embodiment is believed at the time of the filing of this patent application to possibly reside broadly in a tool coupler, characterized in that one of the additional blind bore holes is provided with a microchip comprising a readable memory with information for tool identification or coding.

Still another feature or aspect of an embodiment is believed at the time of the filing of this patent application to possibly reside broadly in a tool coupler, characterized in that the blind bore holes are made such that the tool coupler is statically and dynamically balanced.

A further feature or aspect of an embodiment is believed at the time of the filing of this patent application to possibly reside broadly in a tool coupler, characterized in that, at least in the top area, the diameter of the blind bore holes and/or of the additional blind bore holes is between 10 mm and 20 mm, advantageously between 10 mm and 16 mm.

A further feature or aspect of an embodiment is believed at the time of the filing of this patent application to possibly reside broadly in a tool coupler, characterized in that based on a frontal view, the blind bore holes with varying bore hole contours are provided on a vertical plane relative to the connecting line of the openings in the hollow shaft for locking the clamping elements.

The invention, in at least one possible embodiment, relates to a tool coupler for connecting a replaceable tool head to a machine tool comprising am at least partly or fully conical or cylindrical hollow shaft and a ring-shaped collar interacting with a correspondingly configured receiving bore hole and a ring-shaped opposite surface of a basic holder on a machine tool, where the basic holder and the tool coupler can be locked by means of clamping elements actuated via a clamping device in such a way that the collar of the tool coupler abuts on the opposite surface of the basic holder, and the tool coupler is provided with a continuous gripper groove for a gripping device used in automatic tool replacement. According to at least one possible embodiment of the invention, two diametrically opposite blind bore holes with varying bore hole contours are disposed in the gripper groove.

One feature or aspect of an embodiment is believed at the time of the filing of this patent application to possibly reside broadly in a tool coupler for connecting tool heads, such as drills, reamers, millers, turn-cutters, dies, and rams, to a tool holder, said tool coupler comprising: a connecting portion being configured to be inserted into a receiving bare of a tool holder of a machine to removably connect said tool coupler to the tool holder; a collar portion being disposed adjacent said connecting portion; said collar portion comprising a gripper groove; said gripper groove being configured to permit gripping of said tool coupler by a gripping device of a tool replacer; said collar portion comprises a first blind bore hole and a second blind bore hole, each being disposed opposite one another and having at least a portion disposed in said gripper groove; and said first blind bore hole having a different bore hole contour than said second blind bore hole.

Another feature or aspect of an embodiment is believed at the time of the filing of this patent application to possibly reside broadly in a tool coupler, wherein at least one of: said blind bore holes are disposed centrically relative to said gripper groove; and said blind bore holes have a maximum diameter that is greater than the width of said gripper groove.

Yet another feature or aspect of an embodiment is believed at the time of the tiling of this patent application to possibly reside broadly in a tool coupler, wherein in cross-section, said first and second blind bore holes have a top area wider in diameter and a bottom area with a smaller diameter joining the bottom of each of said blind bore holes; and said first and second blind bore holes are disposed diametrically opposite one another.

Still another feature or aspect of an embodiment is believed at the time of the filing of this patent application to possibly reside broadly in a tool coupler, wherein said bore hole bottom of one of said blind bore holes is flat and said bore hole bottom of the other blind bore hole is configured at least partly conically.

A further feature or aspect of an embodiment is believed at the time of the filing of this patent application to possibly reside broadly in a tool coupler, wherein: said collar portion comprises at least a third blind bore hole and a fourth blind bore, each disposed opposite one another and having at least a portion disposed in said gripper groove; and said third and fourth blind bore holes are each disposed so as to be offset by essentially 90° from said first and second blind bore holes.

Another feature or aspect of an embodiment is believed at the time of the filing of this patent application to possibly reside broadly in a tool coupler, wherein each of said third and fourth blind bore holes are greater in diameter than in depth.

Yet another feature or aspect of an embodiment is believed at the time at the filing of this patent application to possibly reside broadly in a tool coupler, wherein said tool coupler comprises a microchip disposed in one of: said first, second, third and fourth blind bore holes; and said microchip comprises a readable memory with information for tool identification or coding.

Still another feature or aspect of an embodiment is believed at the time of the filing of this patent application to possibly reside broadly in a tool coupler, wherein said blind bore holes are configured and disposed such that the tool coupler is statically and dynamically balanced.

A further feature or aspect of an embodiment is believed at the time of the filing of this patent application to possibly reside broadly in a tool coupler, wherein, at least in the top area, the diameter of each of said first and second blind bore holes and/or of said third and fourth blind bore holes is in the range of one of: 10 mm to 20 mm, and 10 mm to 16 mm.

Another feature or aspect of an embodiment is believed at the time of the filing of this patent application to possibly reside broadly in a tool coupler, wherein, based on a frontal view, said first and second blind bore holes are provided on a plane substantially perpendicular to the connecting line of openings in said connecting portion, which openings are configured to receive clamping elements in a tool holder of a machine to removably connect the tool coupler to the tool holder; said gripper groove is configured to permit gripping of said tool coupler by a gripping device in an automatic tool replacement system; and said tool coupler comprises an at least partly or fully conical cylindrical hollow body.

Some examples of automatic tool systems, tool couplers, tool holders, and components therefore, which may possibly be utilized or adapted for use in at least one possible embodiment may possibly be found in publications published by Kennametal Inc., Latrobe, Pa. 15650, as follows: Catalog 4011 entitled "KM25 Modular Quick-Change Tooling," published in 2004; Catalog 0030 entitled "KM Modular Quick-Change Tooling Systems," published in 2001; brochure entitled "KM Automatic Tooling Systems for the Giddings & Lewis VTC-1250 Series Machines," published in 2003; and brochure entitled "KM Automatic Tooling Systems for the Nakamura Tome STW-40," published in 2002.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description at the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

Some examples of automatic tool changers and components therefore which may possibly be utilized or adapted for use in at least one possible embodiment may possibly be found in the following U.S. Pat. No. 6,508,314, entitled "Automatic tool changer;" U.S. Pat. No. 6,467,145, entitled "Operating unit with an automatic tool changing device and transfer tool machine including the same;" U.S. Pat. No. 6,442,815, entitled "Reconfigurable automatic tool changer;" U.S. Pat. No. 6,135,933, entitled "Automatic tool changing machine;" U.S. Pat. No. 6,106,446, entitled "Automatic tool changing machine;" U.S. Pat. No. 5,499,963, entitled "Automatic tool changer;" U.S. Pat. No. 5,372,568, entitled "Machine tool with automatic tool changer having mechanism for utilizing relative movements of tool and tool changing gripper to clamp and unclamp the tool;" U.S. Pat. No. 5,300,006, entitled "Automatic tool changer;" U.S. Pat. No. 5,250,017, entitled "Automatic tool changer for a machining apparatus;" U.S. Pat. No. 5,134,767, entitled "Automatic tool changing device in machine tool;" U.S. Pat. No. 5,020,210, entitled "Automatic tool changer for a machine tool;" U.S. Pat. No. 4,976,575, entitled "Tool holding system for automatic tool changing;" U.S. Pat. No. 4,928,381, entitled "Automatic tool changer;" U.S. Pat. No. 4,883,939, entitled "Automatic tool changer for workpiece processing machines;" U.S. Pat. No. 4,875,275, entitled "Novel automatic tool changer;" U.S. Pat. No. 4,860,429, entitled "Automatic tool changing device;" U.S. Pat. No. 4,856,177, entitled "Automatic tool changer with electromagnetically readable tool holder having an electromagnetically coupling stopper for numerical control;" U.S. Pat. No. 4,835,838, entitled "Automatic tool changer in machine tool;" U.S. Pat. No. 4,833,772, entitled "Automatic tool changing apparatus;" and U.S. Pat. No. 4,799,308, entitled "Automatic tool changer."

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A tool coupler for connecting tool heads, such as drills, reamers, millers, turn-cutters, dies, and rams, to a tool holder, said tool coupler comprising:
   a connecting portion being configured to be inserted into a receiving opening of a tool holder of a machine to removably connect said tool coupler to the tool holder;
   a collar portion being disposed adjacent said connecting portion;
   said collar portion comprising a gripper groove;
   said gripper groove being configured to permit gripping of said tool coupler by a gripping device of a tool replacer;
   said collar portion comprising a first blind hole and a second blind hole, each being disposed opposite one another and having at least a portion disposed in said gripper groove;
   said first blind hole having a different hole contour than said second blind hole;
   said collar portion further comprising at least a third blind hole and a fourth blind hole, each being disposed diametrically opposite one another and having at least a portion disposed in said gripper groove; and
   said third and fourth blind holes each being disposed so as to be offset by essentially 90° from said first and second blind holes.

2. The tool coupler according to claim 1, wherein at least one of:
   said first and second blind holes are disposed centrically relative to said gripper groove; and
   said first and second blind holes have a maximum diameter that is greater than the width of said gripper groove.

3. The tool coupler according to claim 2, wherein:
   in cross-section, said first and second blind holes have a top area wider in diameter and a bottom area with a smaller diameter joining the bottom of each of said blind holes; and
   said first and second blind holes are disposed diametrically opposite one another.

4. A tool coupler for connecting tool heads, such as drills, reamers, millers, turn-cutters, dies, and rams, to a tool holder, said tool coupler comprising:
   a connecting portion being configured to be inserted into a receiving opening of a tool holder of a machine to removably connect said tool coupler to the tool holder;
   a collar portion being disposed adjacent said connecting portion;
   said collar portion comprising a gripper groove;

said gripper groove being configured to permit gripping of said tool coupler by a gripping device of a tool replacer;

said collar portion comprising a first blind hole and a second blind hole, each being disposed opposite one another and having at least a portion disposed in said gripper groove;

said first blind hole having a different hole contour than said second blind hole;

at least one of:
said first and second blind holes being disposed centrically relative to said gripper groove; and
said first and second blind holes having a maximum diameter that is greater than the width of said gripper groove;

in cross-section, said first and second blind holes having a top area wider in diameter and a bottom area with a smaller diameter joining the bottom of each of said blind holes;

said first and second blind holes being disposed diametrically opposite one another;

said hole bottom of one of said first and second blind holes being flat and said hole bottom of the other blind hole being configured at least partly conically;

said collar portion further comprising at least a third blind hole and a fourth blind hole, each being disposed diametrically opposite one another and having at least a portion disposed in said gripper groove; and said third and fourth blind holes each being disposed so as to be offset by essentially 90° from said first and second blind holes.

5. The tool coupler according to claim 4, wherein each of said third and fourth blind holes are greater in diameter than in depth.

6. The tool coupler according to claim 5, wherein:
said tool coupler comprises a microchip disposed in one of: said first, second, third, and fourth blind holes; and
said microchip comprises a readable memory with information for tool identification or coding.

7. The tool coupler according to claim 6, wherein said blind holes are configured and disposed such that the tool coupler is statically and dynamically balanced.

8. The tool coupler according to claim 7, wherein, at least in the top area, the diameter of each of said first and second blind holes and/or of said third and fourth blind holes is in the range of one of: 10 mm to 20 mm, and 10 mm to 16 mm.

9. The tool coupler according to claim 8, wherein:
based on a frontal view, said first and second blind holes are provided on a plane substantially perpendicular to the connecting line of openings in said connecting portion, which openings are configured to receive clamping elements in a tool holder of a machine to removably connect the tool coupler to the tool holder;
said gripper groove is configured to permit gripping of said tool coupler by a gripping device in an automatic tool replacement system; and
said tool coupler comprises an at least partly or fully conical cylindrical hollow body.

10. Tool coupler for connecting a replaceable tool head to a machine tool comprising an at least partly or fully conical or cylindrical hollow shaft (10) and a ring-shaped collar (12) interacting with a correspondingly configured receiving hole and a ring-shaped opposite surface of a basic holder on the machine tool, where the basic holder and the tool coupler can be locked by means of clamping elements actuated via a clamping device in such a way that the collar (12) of the tool coupler abuts on the opposite surface of the basic holder, and the tool coupler is provided with a continuous gripper groove (13) for a gripping device used in automatic tool replacement, wherein the gripper groove (13) is provided with two diametrically opposite blind holes (14, 15) with varying hole contours, and is provided with two more diametrically opposite blind holes (16) disposed so as to be offset by 90° from the blind holes (14, 15) with varying hole contours.

11. The tool coupler according to claim 10, wherein the blind holes (14, 15) are disposed centrically relative to the gripper groove (13) and/or have a maximum diameter that is greater than the width of the groove.

12. The tool coupler according to claim 11, wherein in cross-section the blind holes (14, 15) have a top area (17) wider in diameter and a bottom area (18, 19) with a smaller diameter joining the hole bottom.

13. The tool coupler according to claim 12, wherein the hole bottom of one of the blind holes (14, 15) is flat and the bottom of the other one of the blind holes (14, 15) is configured at least partly conically.

14. The tool coupler according to claim 13, wherein the additional blind holes (16) are greater in diameter (a) than in depth (b).

15. The tool coupler according to claim 14, wherein one of the blind holes is provided with a microchip comprising a readable memory with information for tool identification or coding.

16. The tool coupler according to claim 15, wherein the blind holes (14, 15 and 16) are made such that the tool coupler is statically and dynamically balanced.

17. The tool coupler according to claim 16, wherein, at least in the top area, the diameter of the blind holes (14, 15) and/or of the additional blind holes (16) is one of: between 10 mm and 20 mm, and between 10 mm and 16 mm.

18. The tool coupler according to claim 17, wherein based on a frontal view, the blind holes (14, 15) with varying hole contours are provided on a vertical plane relative to the connecting line of the openings (11) in the hollow shaft (10) for locking the clamping elements.

* * * * *